United States Patent
Ji et al.

(10) Patent No.: US 8,485,307 B2
(45) Date of Patent: Jul. 16, 2013

(54) RACK DRIVING-TYPE POWER ASSISTED STEERING APPARATUS

(75) Inventors: Sung Ho Ji, Seoul (KR); Hong Yong Bhae, Yongin-si (KR)

(73) Assignee: Mando Corporation, Pyeongtaek-Si (KR)

( * ) Notice: Subject to any disclaimer, the term of this patent is extended or adjusted under 35 U.S.C. 154(b) by 0 days.

(21) Appl. No.: 13/481,484

(22) Filed: May 25, 2012

(65) Prior Publication Data

US 2012/0298439 A1    Nov. 29, 2012

(30) Foreign Application Priority Data

May 25, 2011    (KR) .......................... 10-2011-0049460

(51) Int. Cl.
*B62D 5/04*    (2006.01)
(52) U.S. Cl.
USPC .......................................................... 180/444

(58) Field of Classification Search
USPC .................................................... 180/443, 444
See application file for complete search history.

(56) References Cited

U.S. PATENT DOCUMENTS

| 8,307,940 | B2 * | 11/2012 | Bugosh et al. | 180/444 |
| 2003/0192734 | A1 * | 10/2003 | Bugosh | 180/444 |
| 2007/0102230 | A1 * | 5/2007 | Namgung et al. | 180/444 |
| 2010/0319471 | A1 * | 12/2010 | Nam et al. | 74/89.23 |
| 2013/0043088 | A1 * | 2/2013 | Heo et al. | 180/444 |
| 2013/0048411 | A1 * | 2/2013 | Lee | 180/444 |

* cited by examiner

*Primary Examiner* — Tony Winner
(74) *Attorney, Agent, or Firm* — McDermott Will & Emery LLP

(57) ABSTRACT

A rack driving-type power assisted steering apparatus having effects of preventing a lock screw from being loosened due to vibration in axial and radial directions generated by a rack bar, a ball nut, and a rack housing when the rack bar slides while the ball nut rotates, reducing vibration and noise of the ball nut and the rack bar transferred through a bearing, and providing a driver with steering comfortability.

11 Claims, 8 Drawing Sheets

RACK DRIVING-TYPE POWER ASSISTED STEERING APPARATUS

BACKGROUND OF THE INVENTION

1. Field of the Invention

The present invention relates to a rack driving-type power assisted steering apparatus. More particularly, the present invention relates to a rack driving-type power assisted steering apparatus, which can prevent a lock screw from being loosened due to vibration in axial and radial directions generated by a rack bar, a ball nut, and a rack housing when the rack bar slides while the ball nut rotates, reduce vibration and noise of the ball nut and the rack bar transferred through a bearing, and provide a driver with steering comfortability.

2. Description of the Prior Art

A power assisted steering apparatus of a vehicle has generally adopted a hydraulic power steering apparatus using hydraulic power of a hydraulic power pump. However, an electric power steering apparatus using a motor has been gradually and widely used recently.

A general electric power steering apparatus generally includes a steering system extending from a steering wheel to wheels in both sides and an auxiliary power mechanism for supplying auxiliary steering power to the steering system.

The auxiliary power mechanism includes a torque sensor for sensing steering torque applied to the steering wheel by the driver and outputting an electric signal proportional to the sensed steering torque, an Electric Control Unit (ECU) for generating a control signal based on the electric signal transferred from the torque sensor, a motor for generating auxiliary steering power based on the control signal transferred from the ECU, and a belt-type electric power apparatus for transferring auxiliary power generated in the motor to the rack bar through a belt.

FIG. 1 is a partial sectional view schematically illustrating a rack driving-type power assisted steering apparatus according to a prior art and FIG. 2 is a sectional view schematically illustrating a part of the rack driving-type power assisted steering apparatus according to the prior art.

As illustrated in FIGS. 1 and 2, the rack driving-type power assisted steering apparatus according to the prior art includes a rack bar 140 extending in a transverse direction of a vehicle and including a rack gear formed at one side of an outer peripheral surface of the rack bar 140, a pinion shaft 110 including a pinion gear engaged with the rack gear, a ball nut 210 engaged with an outer peripheral screw groove 145 through balls 220, a belt-type electric power apparatus 160 for connecting the ball nut 210 and a motor shaft 155, and a motor 150.

The pinion shaft 110 is connected to a steering wheel through a steering shaft, and the rack bar 140 provided with the outer peripheral screw groove 125 having a predetermined length at one side of an outer peripheral surface of the rack bar is embedded in a rack housing 120.

The belt-type electric power apparatus 160 includes the belt for connecting the motor shaft 155 and the ball nut 210 and transfers the auxiliary steering power generated by the motor 150 proportional to the steering torque applied to the steering wheel to the rack bar 140 through the ball nut 210.

As illustrated in FIG. 2, the rack driving-type power assisted steering apparatus according to the prior art includes the rack bar 140 provided with the outer peripheral screw groove 145 at the outer peripheral surface thereof, the ball nut 210 provided with a center path 215 for circulation of balls 220, the balls 220 rolling while being in contact with the outer peripheral screw groove 145 and the center path 215 of the rack bar 140, and an end cap 230 attached to a distal end of the ball nut 210.

In the rack driving-type power assisted steering apparatus, the rack bar 140 slides according to the rolling movement of the balls 220 while the balls 220 are in contact with the outer peripheral screw groove 145 of the rack bar 140 and an inner peripheral screw groove of the ball nut 210.

However, the rack driving-type power assisted steering apparatus according to the prior art has a problem in that noise and vibration are generated through the rack bar, the ball nut, the bearing, and the rack housing when the rack bar slides while the ball nut rotates, and the generated noise and vibration are transferred to other components to cause coupled components to become loosened.

Further, the transferred noise and vibration are transferred to the driver together with vibration and noise of other components, thereby decreasing steering comfortability of a driver.

SUMMARY OF THE INVENTION

Accordingly, the present invention has been made to solve the above-mentioned problems occurring in the prior art, and the present invention provides a rack driving-type power assisted steering apparatus for a vehicle, which prevents a lock screw from being loosened due to vibration in axial and radial directions generated by a rack bar, a ball nut, and a rack housing when the rack bar slides while the ball nut rotates, reduces the vibration and the noise of the ball nut and the rack bar transferred through a bearing, and provides a driver with steering comfortability.

In accordance with an aspect of the present invention, there is provided a rack driving-type power assisted steering apparatus including: a ball nut for sliding a rack bar, the ball nut rotating while being coupled to the rack bar through balls; a bearing mounted in an outer peripheral surface of the ball nut and configured to support rotation of the ball nut; a lock screw coupled between an extrados of the bearing and a gear housing and configured to support the bearing; and a fastening ring coupled between a rack housing and the gear housing and provided with at least one support part for supporting the lock screw in a direction of a center axis.

Accordingly, the rack driving-type power assisted steering apparatus for the vehicle of the present invention has effects of preventing a lock screw from being loosened due to vibration in axial and radial directions generated by a rack bar, a ball nut, and a rack housing when the rack bar slides while the ball nut rotates, reducing the vibration and the noise of the ball nut and the rack bar transferred through a bearing, and providing a driver with steering comfortability.

DETAILED DESCRIPTION OF THE EXEMPLARY EMBODIMENTS

Figure 1:
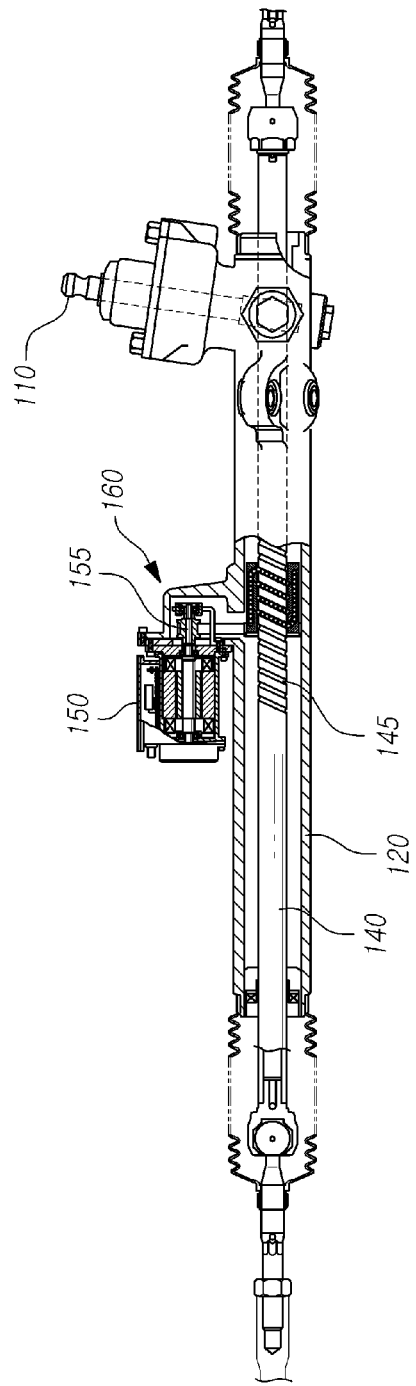
FIG. 1 is a partial sectional view schematically illustrating a rack driving-type power assisted steering apparatus according to a prior art.
Figure 2:
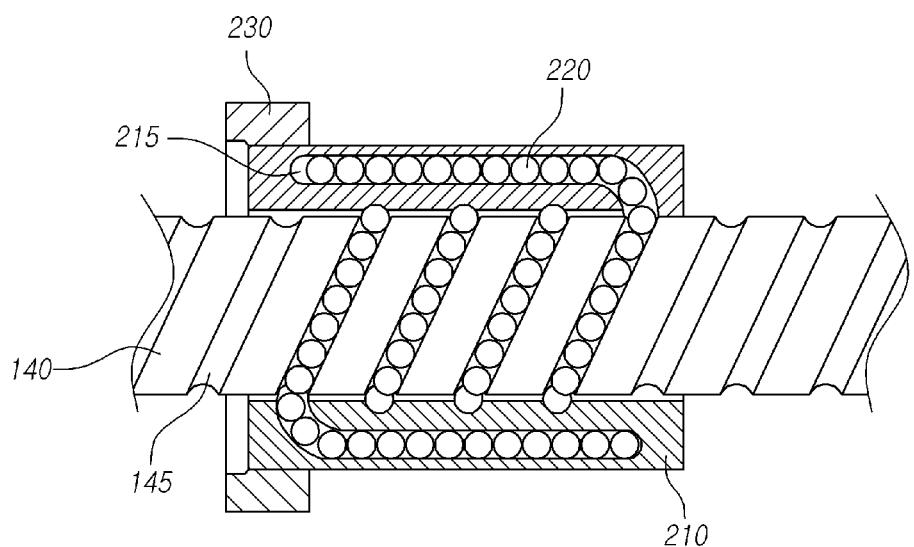
FIG. 2 is a sectional view schematically illustrating a part of the rack driving-type power assisted steering apparatus according to the prior art.

Hereinafter, exemplary embodiments of the present invention will be described with reference to the accompanying drawings. In the following description, the same elements will be designated by the same reference numerals although they are shown in different drawings. In the following description, detailed explanation of known related functions and constitutions may be omitted to avoid unnecessarily obscuring the subject manner of the present invention.

Further, in describing the constructional elements of the present invention, the terms of a first, a second, A, B, (a), (b), or the like, can be used. Such a term is only for discriminating the constructional element from another constructional element, and does not limit the essential feature, order, or sequence of the constructional element, or the like. If one constructional element is "coupled to", "assembled with", or "connected to" another constructional element, one constructional element is directly coupled to or connected to another constructional element, but it can be understood as another different constructional element can be "coupled", "assembled", or "connected" between each constructional element.

Figure 3:
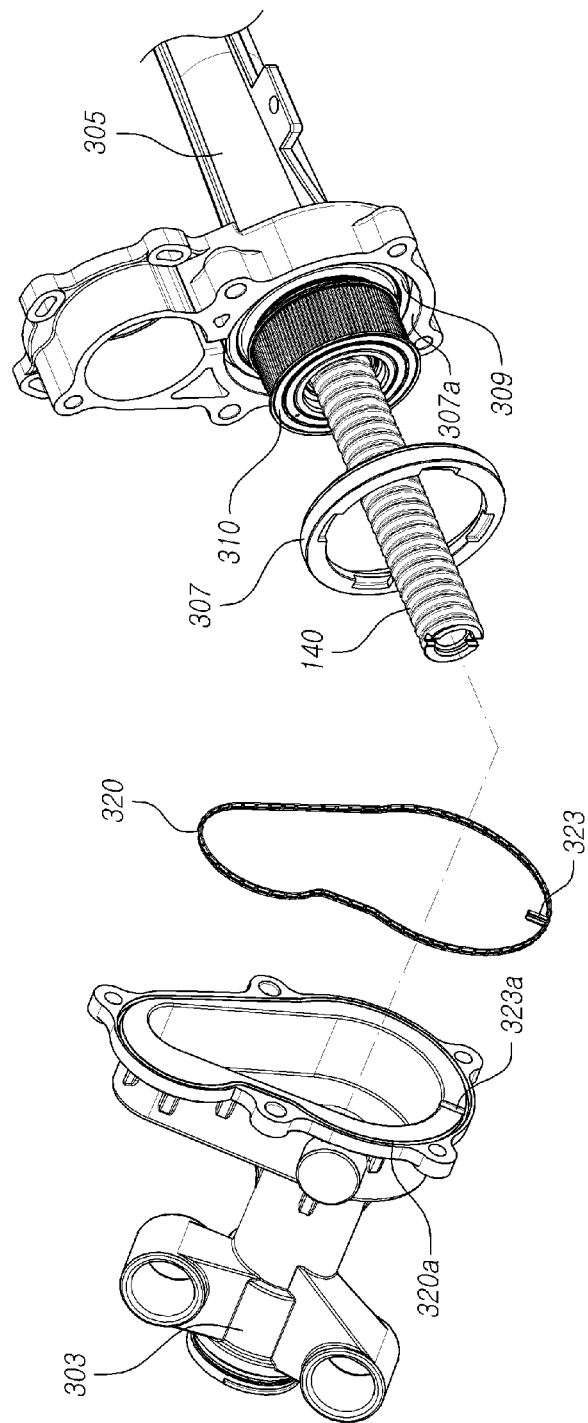
FIG. 3 is an exploded perspective view illustrating a part of a rack driving-type power assisted steering apparatus according to an embodiment of the present invention.
Figure 4:
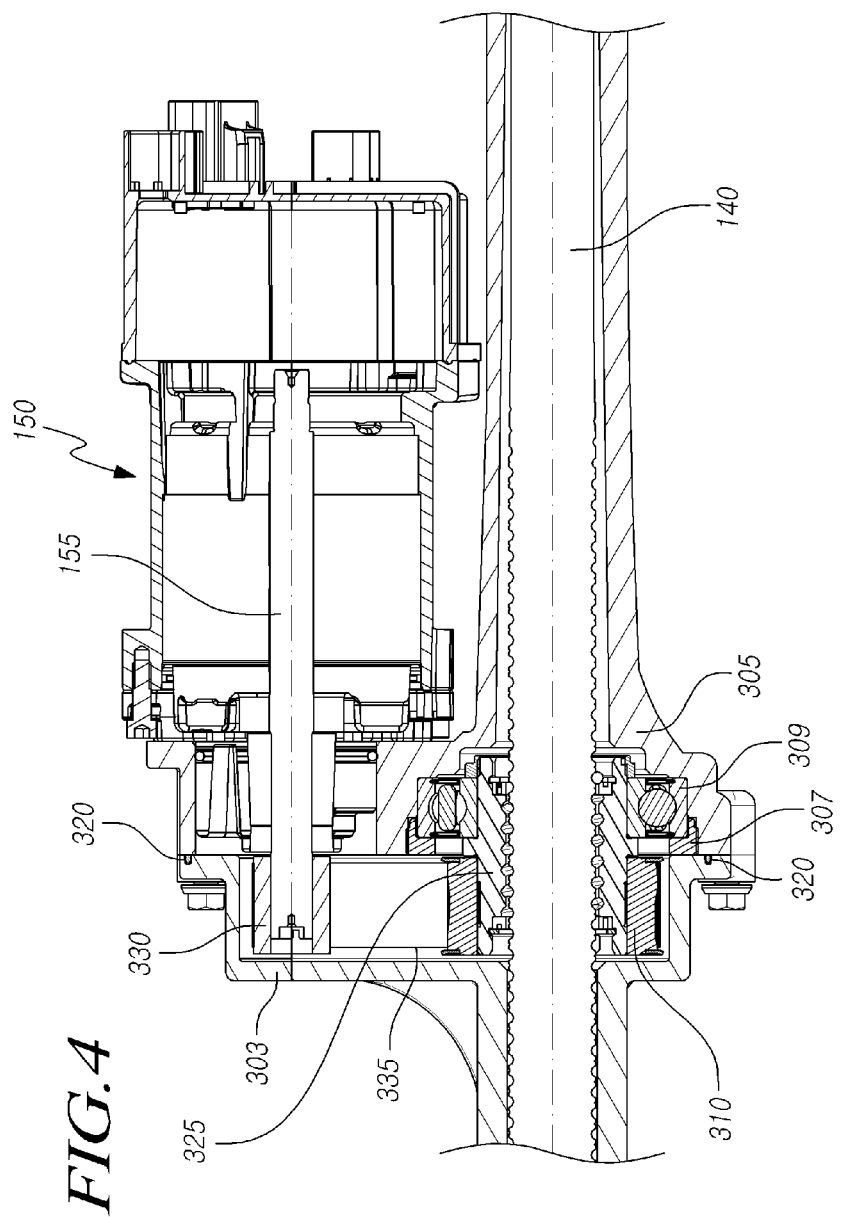
FIG. 4 is a sectional view illustrating a rack driving-type power assisted steering apparatus according to an embodiment of the present invention.
Figure 5:
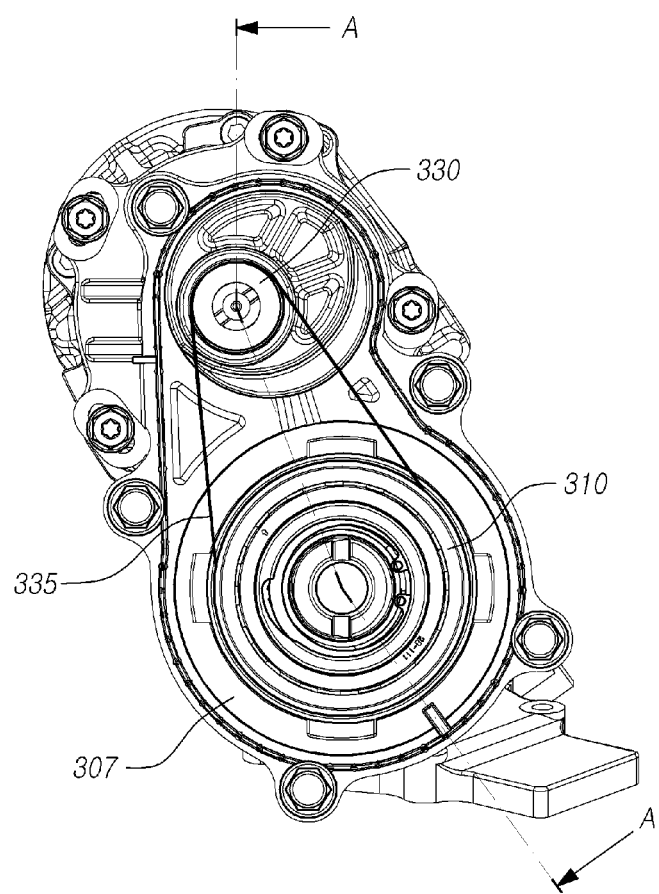
FIG. 5 is a side view illustrating a rack driving-type power assisted steering apparatus according to an embodiment of the present invention.
Figure 6:
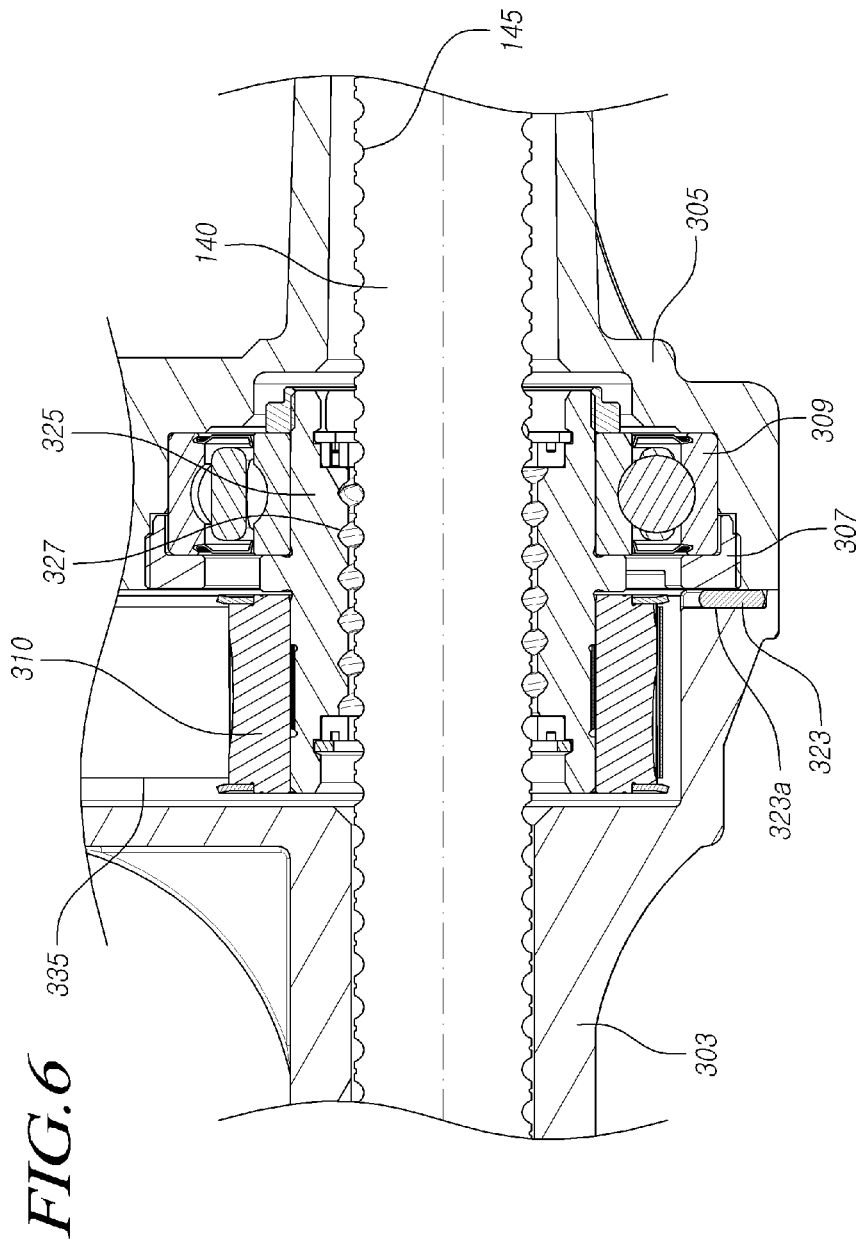
FIG. 6 is a sectional view viewed in direction A of FIG. 5.
Figure 7:
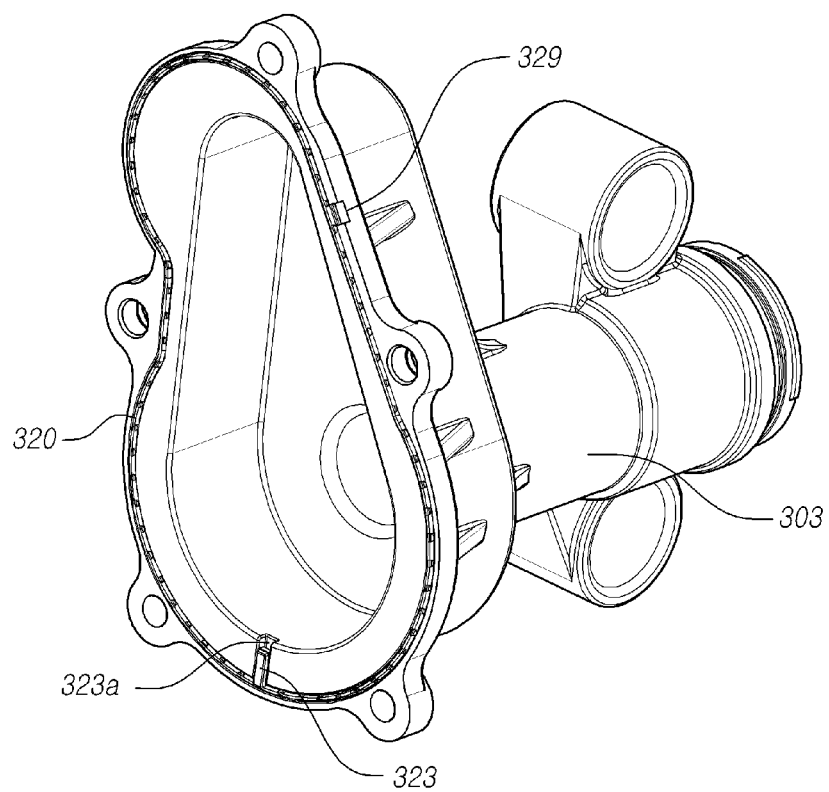
FIG. 7 is an exploded perspective view illustrating a part of a rack driving-type power assisted steering apparatus according to an embodiment of the present invention.
Figure 8:
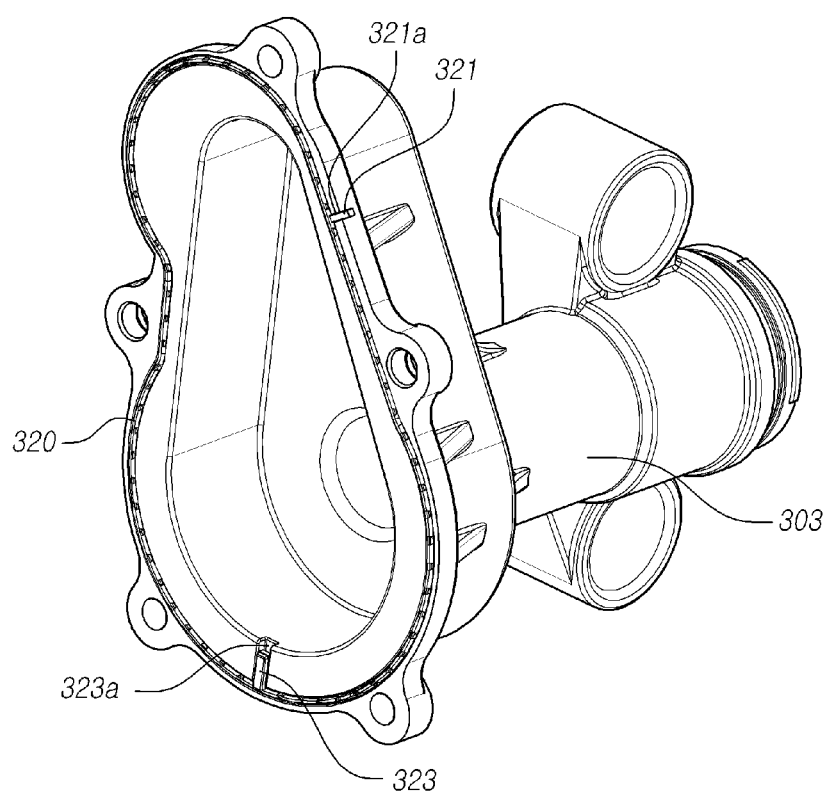
FIG. 8 is an exploded perspective view illustrating a modified embodiment of FIG. 7.

FIG. 3 is an exploded perspective view illustrating a part of a rack driving-type power assisted steering apparatus according to an embodiment of the present invention, FIG. 4 is a sectional view illustrating a rack driving-type power assisted steering apparatus according to an embodiment of the present invention, FIG. 5 is a side view illustrating a rack driving-type power assisted steering apparatus according to an embodiment of the present invention, FIG. 6 is a sectional view viewed in direction A of FIG. 5, FIG. 7 is an exploded perspective view illustrating a part of a rack driving-type power assisted steering apparatus according to an embodiment of the present invention, and FIG. 8 is an exploded perspective view illustrating a modified embodiment of FIG. 7.

As illustrated in FIGS. 3 to 8, the rack driving-type power assisted steering apparatus according to the present invention includes a ball nut 325 for sliding a rack bar 140, the ball nut 325 rotating while being engaged with the rack bar 140 through balls, a bearing 309 mounted on an outer peripheral surface of the ball nut 325 and configured to support the rotation of the ball nut 325, a lock screw 307 coupled between an extrados of the bearing 309 and a gear housing 305 and configured to support the bearing 309, and a fastening ring 320 coupled between the rack housing 303 and the gear housing 305 and provided with least one support part 323 for supporting the lock screw 307 in a direction of a center axis.

The rack driving-type power assisted steering apparatus includes a driving means and a driven means. The driving means includes an electric power motor 150 controlled by an ECU, a driving pulley 330 fixed to a shaft 155 of the electric power motor 150, and a driving belt 335.

Further, the driven means includes the ball nut 325 for supporting the rack bar 140 in an inner side of the rack housing 303 enclosing the rack bar 140 and a driven pulley 310 separately formed in or coupled to an outer peripheral surface of the ball nut 325.

The driving pulley 330 connected with the electric power motor 150 and the driven pulley 310 connected with the rack bar 140 are disposed in parallel. The driving belt 335 is fitted to the driving pulley 330 and the driven pulley 310 so that a rotation force of the electric power motor 150 is transferred to the rack bar 140 through the ball nut 325, and the rack bar 140 moves in left and right directions by a movement of the ball nut 325, and thus an auxiliary steering power is generated.

The ball nut 325 makes the rack bar 140 slide in insides of the rack housing 303 and the gear housing 305 while being engaged with the rack bar 140 through the balls and rotating. The bearing 309 for supporting the rotation of the ball nut 325 is mounted in the outer peripheral surface of the ball nut 325.

A power transferring structure is formed in the inner peripheral surface of the ball nut 325 and the outer peripheral surface of the rack bar 140 such that the auxiliary steering power is generated by sliding the rack bar 140 in a shaft direction. The power transferring structure includes an outer peripheral screw groove 145 formed at the outer peripheral surface of the rack bar 140 and shaped like a spiral and a domed section, the balls (not shown) inserted in the outer peripheral screw groove 145, and an inner peripheral screw groove 327 formed at the inner peripheral surface of the ball nut 325 and shaped like a spiral and a domed section such that the inner peripheral screw groove 327 corresponds to the outer peripheral screw groove 145.

The ball nut 325 is a hollow tube provided with the inner peripheral screw groove 327 formed at the inner peripheral surface thereof. The driven pulley 310 is closely installed in both sides of the outer peripheral surface of the ball nut 325, the bearing 309 is installed in an outer peripheral side of one end of the ball nut 325, and the lock screw 307 is screw-assembled with and fixed to an inner peripheral surface 309a of the gear housing 305 at the distal end of an extrados of the bearing 309 and one end of the outer peripheral surface of the bearing 309 while supporting the bearing 309.

The fastening ring 320 coupled between the rack housing 303 and the gear housing 305 includes at least one support part 323 for supporting the lock screw 307 in a direction of the center axis, so that the fastening ring damps the vibration and the noise transferred through the bearing 309 while preventing the lock screw 307 from being loosened.

Further, as illustrated in FIG. 7, a check hole 329 may be formed in a region in which the rack housing 303 is coupled to the gear housing 305 such that whether the assembling of the fastening housing 320 is omitted may be checked from the outside. Accordingly, whether the assembling of the component is omitted may be checked without a disassembling operation after the final assembling of the steering apparatus. FIG. 7 illustrates an example of the check hole 329 formed in the rack housing 303.

Further, the support part 323 integrally extends and protrudes from the fastening ring 320 such that the support part 323 is positioned in a side surface of the lock screw 307. The rack housing 303 is provided with a seating recess 320a in which the fastening ring 320 is inserted, and the seating recess 320a is provided with a support recess 323a in which the support part 323 is inserted.

The support part 323 has a thickness to the extent that the support part 323 protrudes from the support recess 323a of the gear housing 305 when the support part 323 is inserted in the support recess 323a of the gear housing 305, and the support part 323 is compressed against and coupled to the side surface of the lock screw 307 when the rack housing 303 is coupled to the gear housing 305. Although it is not illustrated, a fixing recess in which the support part 323 is inserted may be formed in the side surface of the lock screw 307.

Accordingly, when the rack housing 303 is coupled to the gear housing 305 through a fastening member while the rack housing 303 is in contact with the gear housing 305, the fastening ring 320 is compressed and the support part 323 is simultaneously supported while being compressed against the side surface of the lock screw 307. Accordingly, the vibration and the noise transferred through the bearing are damped while the looseness of the lock screw is prevented.

Further, as illustrated in FIG. 8, the fastening ring 320 may be provided with a protrusion 321 integrally extending and protruding from the fastening ring 320. The protrusion 321 is exposed to the outside when the fastening ring 320 is coupled between the rack housing 303 and the gear housing 305, so that the coupling position of the fastening ring 320 or whether the fastening ring 320 has been coupled may be checked.

Further, the rack housing 303 or the gear housing 305 is provided with an insertion recess 321a in which the protrusion 321 is inserted, so that the fastening ring 320 may be assembled while the protrusion 321 is placed at a position of the insertion recess 321a when the fastening ring 320 is coupled between the rack housing 303 and the gear housing 305. FIG. 8 illustrates an example of the insertion recess 321a formed in the rack housing 303.

The fastening ring 320 is made of a material, such as NR (Natural Rubber), BR (Polybutadiene Rubber), NBR (Nitrile Butadiene Rubber), CR (Chloroprene Rubber), EPDM (Ethylene Propylene Terpolymer), FPM (Fluoro Elastomer), SBR (Styrene Butadine Rubber), CSM (Chlorosulphonated Polyethylene), silicon, and urethane, such that the fastening ring 320 has weatherability and elasticity, thereby functioning as a damper for absorbing noise and vibration.

As described above, the present invention has effects of preventing the lock screw from being loosened due to vibration in axial and radial directions generated by the rack bar, the ball nut, and the rack housing when the rack bar slides while the ball nut rotates, reducing the vibration and the noise of the ball nut and the rack bar transferred through the bearing, and providing a driver with steering comfortability.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although an exemplary embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A rack driving power assisted steering apparatus comprising:
    a ball nut for sliding a rack bar, the ball nut rotating while being coupled to the rack bar through balls;
    a bearing mounted in an outer peripheral surface of the ball nut and configured to support rotation of the ball nut;
    a lock screw coupled between an extrados of the bearing and a gear housing and configured to support the bearing; and
    a fastening ring coupled between a rack housing and the gear housing and provided with at least one support part for supporting the lock screw in a direction of a center axis.

2. A rack driving power assisted steering apparatus as claimed in claim 1, wherein the rack housing or the gear housing is provided with a seating recess in which the fastening ring is inserted.

3. A rack driving power assisted steering apparatus as claimed in claim 2, wherein the support part integrally extends and protrudes from the fastening ring such that the support part is positioned in a side surface of the lock screw.

4. A rack driving power assisted steering apparatus as claimed in claim 3, wherein the seating recess includes a support recess in which the support part is inserted.

5. A rack driving power assisted steering apparatus as claimed in claim 4, wherein the support part protrudes from the support recess and is compressed against and coupled to the side surface of the lock screw when the rack housing is coupled to the gear housing.

6. A rack driving power assisted steering apparatus as claimed in claim 5, wherein the lock screw is provided with a fixing recess in which the support part is inserted in the side surface of the lock screw.

7. A rack driving power assisted steering apparatus as claimed in claim 1, wherein a check hole is formed in a region in which the rack housing is coupled to the gear housing, so as to allow a checking of whether assembling of the fastening ring is omitted from an outside.

8. A rack driving power assisted steering apparatus as claimed in claim 1, wherein the fastening ring comprises a protrusion exposed to the outside when the fastening ring is coupled between the rack housing and the gear housing, so as to allow a checking of a coupling position of the fastening ring or of whether the fastening ring has been coupled.

9. A rack driving power assisted steering apparatus as claimed in claim 8, wherein the protrusion integrally extends and protrudes from the fastening ring.

10. A rack driving power assisted steering apparatus as claimed in claim 9, wherein the rack housing or the gear housing is provided with an insertion recess in which the protrusion is inserted.

11. A rack driving power assisted steering apparatus as claimed in one of claims 1 to 10, wherein the fastening ring is made of one material among NR (Natural Rubber), BR (Polybutadiene Rubber), NBR (Nitrile Butadiene Rubber), CR (Chloroprene Rubber), EPDM (Ethylene Propylene Terpolymer), FPM (Fluoro Elastomer), SBR (Styrene Butadine Rubber), CSM (Chlorosulphonated Polyethylene), silicon, and urethane.

* * * * *